United States Patent [19]

Cage et al.

[11] Patent Number: 4,702,335

[45] Date of Patent: Oct. 27, 1987

[54] CONTROL APPARATUS FOR A POWER ASSIST STEERING SYSTEM

[75] Inventors: Jerry L. Cage, Granger; Jonathan B. Kulp, West Lafayette, both of Ind.

[73] Assignee: TRW Inc., Lyndhurst, Ohio

[21] Appl. No.: 738,601

[22] Filed: May 28, 1985

[51] Int. Cl.$^4$ .............................................. B62D 5/06
[52] U.S. Cl. ................................ 180/142; 74/388 PS; 180/143; 364/424
[58] Field of Search ................. 180/142, 141, 132, 79, 180/79.1; 91/375 A, 462; 417/300, 310; 251/250, 282; 335/262; 74/388 PS; 364/424

[56] References Cited

U.S. PATENT DOCUMENTS

| | | | |
|---|---|---|---|
| 2,698,006 | 9/1953 | Wichmann et al. | 91/372 |
| 3,011,579 | 1/1959 | Milliken, Jr. et al. | 180/142 |
| 3,606,819 | 9/1971 | Venable et al. | 91/375 A |
| 3,744,515 | 7/1973 | Inoue | 180/143 X |
| 3,939,938 | 2/1976 | Inoue | 180/142 |
| 4,055,232 | 10/1977 | Moore | 180/132 |
| 4,099,893 | 7/1978 | Coffman | 417/300 |
| 4,267,897 | 5/1981 | Takeshima | 335/262 X |
| 4,392,540 | 7/1983 | Michio et al. | 180/142 |
| 4,437,532 | 3/1984 | Nakamura et al. | 180/143 X |
| 4,456,087 | 6/1984 | Lang et al. | 180/142 |
| 4,473,128 | 9/1984 | Nakayama et al. | 180/142 |
| 4,476,529 | 10/1984 | Nakamura et al. | 364/424 |
| 4,513,835 | 4/1985 | Fukino et al. | 180/142 |
| 4,574,905 | 3/1986 | Asano et al. | 180/142 |
| 4,626,994 | 12/1986 | Yabe et al. | 364/424 |

FOREIGN PATENT DOCUMENTS

| | | |
|---|---|---|
| 342826 | 1/1985 | Fed. Rep. of Germany . |
| 59-19546 | 8/1984 | Japan . |
| 1379606 | 1/1975 | United Kingdom ................ 180/142 |
| 2132950A | 7/1984 | United Kingdom . |
| 2135642A | 9/1984 | United Kingdom . |
| 2136370A | 9/1984 | United Kingdom . |

*Primary Examiner*—John J. Love
*Assistant Examiner*—Mitchell J. Hill
*Attorney, Agent, or Firm*—Tarolli, Sundheim & Covell

[57] ABSTRACT

A control apparatus for a power steering system comprises an electrically actuated flow control valve that varies the power assist available, a speed sensor for generating a signal indicative of vehicle speed, and a selector switch for selecting one of a plurality of power assist control options. The apparatus further includes a microprocessor that controls the electrically actuated flow control valve in response to the signal from the speed sensor and the setting of the selector switch. The apparatus also provides manually selectable power assist that is set by the operator and remains constant independent of variations in vehicle speed. A display provides a visual indication to the operator of the power assist available.

9 Claims, 6 Drawing Figures

CONTROL APPARATUS FOR A POWER ASSIST STEERING SYSTEM

TECHNICAL FIELD

The present invention relates to a vehicle steering system and is particularly directed to an apparatus for controlling a power assist steering system.

BACKGROUND ART

Power assist steering systems for land vehicles that provide assistance during a steering maneuver are well known. Such systems typically utilize hydraulic power or electric power.

During operation of a vehicle at a relatively low speed, such as during dry surface parking, there is a relatively large resistance to turning movement of the steerable vehicle wheels. As vehicle speed increases, the resistance to turning movement of the steerable vehicle wheels decreases. To compensate for the decreasing steering resistance, some power assist steering systems provide one level of steering assist at low vehicle speeds and decreasing assist as vehicle speed increases. To accomplish such variable assist, power assist steering systems have been designed to monitor the vehicle speed and to control the power assist in response to the monitored vehicle speed.

One proposed hydraulic power assist steering system that controls power assist in response to vehicle speed is disclosed in U.S. Pat. No. 4,456,087 to Lang et al. The steering system includes an electromagnetic valve that is actuated by a microprocessor and a speed sensor which generates a signal indicative of the vehicle speed. The microprocessor includes a read only memory having stored tabulated data based on a functional relationship between the speed dependent input signal from the speed sensor and a desired fluid pressure signal control to be exercised by the electromagnetic actuated valve. The microprocessor controls the valve in response to vehicle speed and in accordance with the stored tabulated data.

In power assist steering systems that vary the power assist in response to vehicle speed, the power assist at any given vehicle speed is preset. Since satisfactory steering "feel" is a subjective interpretation, vehicle operators have varying opinions as to the power assist they would like at a given vehicle speed.

SUMMARY OF THE INVENTION

The present invention relates to an apparatus for controlling power assist in a steering system in response to a manually settable power assist control option and sensed vehicle speed. The apparatus also provides a means to maintain power assist at a manually selected, fixed amount that does not vary with vehicle speed.

An apparatus for controlling a power assist steering system, in accordance with the present invention, comprises a first means operable to vary the power assist, a speed sensor means for generating a signal indicative of the vehicle speed and manually settable selection means for selecting one of a plurality of steering assist control options. The apparatus further includes second means for controlling the first means in response to (i) the signal from the speed sensor means and (ii) the setting of the selection means.

In a preferred embodiment, a valve having a controllable orifice is positioned between a power steering pump and a power steering gear assembly having a hydraulically actuatable steering assist motor operatively coupled to the steerable vehicle wheels. A speed sensor generates an electric signal having a frequency that is proportional to the vehicle speed. A selector switch is provided having a plurality of settings for selecting one of a plurality of possible steering assist control options. A microprocessor determines the vehicle speed from the speed sensor signal and decodes the setting of the selector switch. The microprocessor includes a plurality of sets of memory locations, the number of sets of memory locations preferably corresponding to the number of settings on the selector switch. Each set of memory locations includes tabulated data that has a valve position value for each given vehicle speed. The flow rate of pressurized fluid from the pump to the steering gear assembly is controlled by the orifice size of the valve. The microprocessor controls the valve orifice to vary the fluid output flow from the pump to the steering gear assembly in response to the the signal from the speed sensor and the tabulated data from a set of memory locations selected by the setting of the selector switch.

The apparatus in accordance with the present invention also includes a mode selector switch to change from the above-described settable, automatic power assist control mode to a manually selected fixed, power assist mode. In the manually selected fixed, power assist mode, the microprocessor maintains the power assist at a constant value independent of the vehicle speed, the power assist being settable by the vehicle operator.

A visual display is provided to indicate in both the settable, automatic mode and the manually selected, fixed control mode the power assist available to assist in a steering maneuver.

BRIEF DESCRIPTION OF THE DRAWINGS

The foregoing and other objects and advantages of the present invention will become more readily apparent from the following detailed description of a preferred embodiment made in conjunction with the accompanying drawings, wherein.

DETAILED DESCRIPTION

Figure 1:
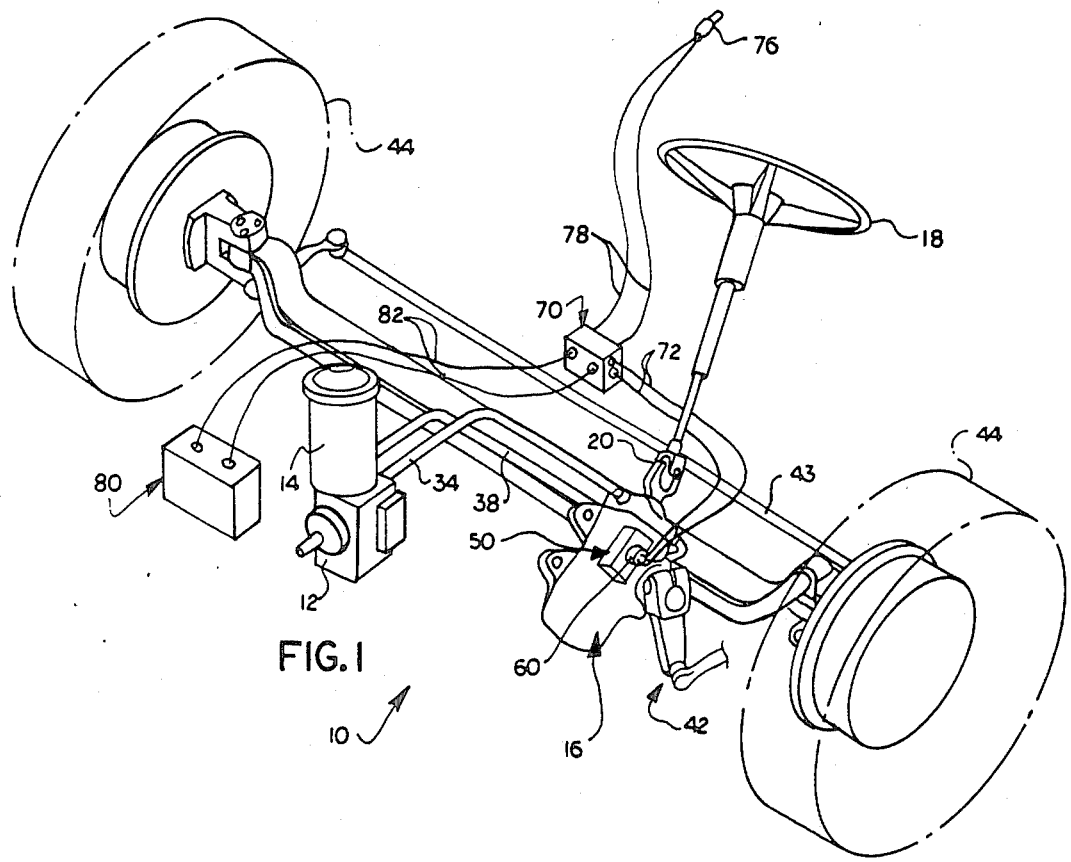
FIG. 1 is a schematic illustration of a power assist steering system including a control apparatus according to the present invention.
Figure 2:
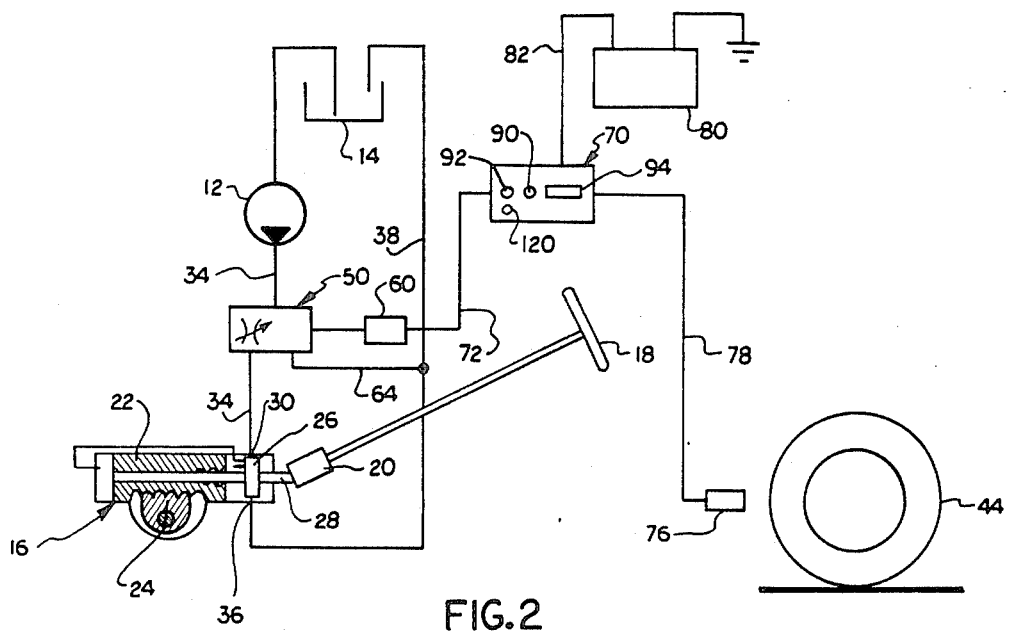
FIG. 2 is a further schematic illustration of the power assist steering system of FIG. 1.
Figure 3:
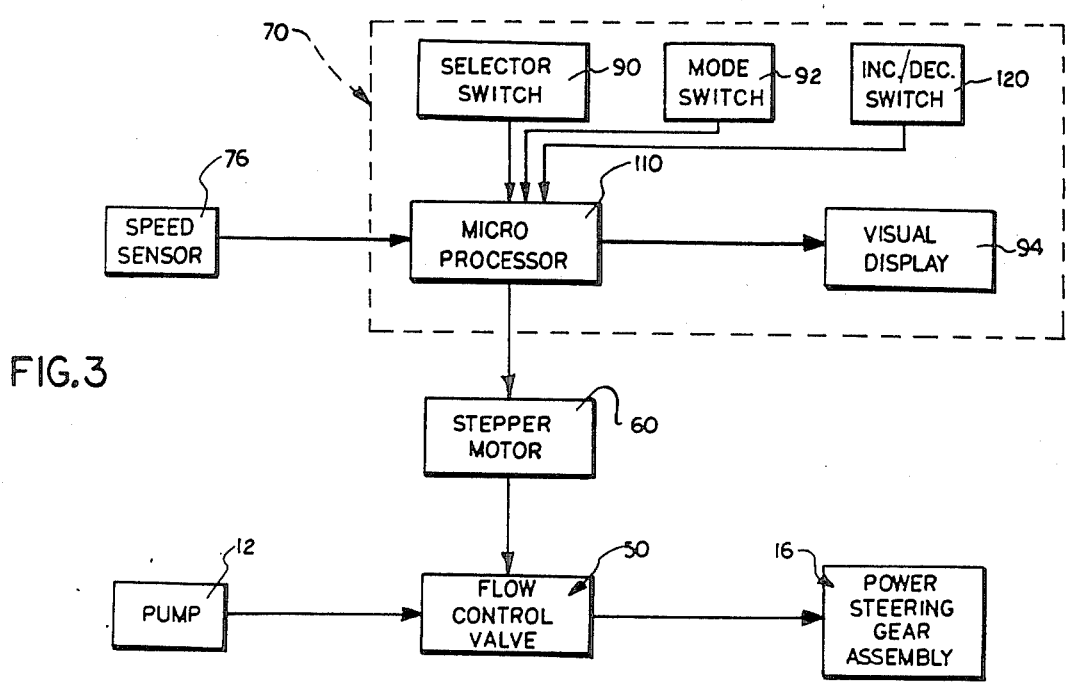
FIG. 3 is a block diagram of the power assist steering system of FIG. 1.

Referring to FIGS. 1-3, a power assist steering system 10 includes a pump 12 that pumps fluid from a reservoir 14 to a power steering gear assembly 16. An operator steering wheel 18 is operatively connected to the power steering gear assembly 16 through a universal joint 20.

The power steering gear assembly 16 can be one of several types known in the art. One power steering gear assembly that can be utilized with the present invention is fully described in detail in U.S. Pat. No. 3,606,819 to Venable et al. and is hereby fully incorporated herein by reference. The power steering gear assembly 16 includes a piston 22 having linear rack teeth in meshing engagement with teeth on a gear segment 24. An open-center valve 26 is coupled to an input shaft 28 which is connected through the universal joint 20 to the operator steering wheel 18. The input shaft 28 is also connected to the piston 22 through a recirculating ball nut in a known manner such that rotation of the steering wheel 18 causes linear motion of the piston 22. Linear motion of the piston 22 causes the gear segment 24 to rotate about its mounting axis. The steering gear assembly 16 further includes an input port 30 connected to the hydraulic pump 12 through a conduit 34 and an output port 36 connected to the reservoir 14 through a return conduit 38.

The gear segment 24 is operatively connected to a Pitman arm 42 which is in turn connected to steering linkage of the vehicle in a known manner. Operation of the steering linkage from movement of the Pitman arm is well known in the art and will not be described in detail herein. Simply, rotary motion of the gear segment 24 drives the Pitman arm 42 which drives through an intermediate drag link 43 the vehicle wheels 44.

When no steering maneuver is inputted by the steering wheel 18, the open-center directional control valve 26 is in its neutral open-center position and provides flow-through communication from its input port 30 to its output port 36. During steering, rotation of the steering wheel 18 and input shaft 28, actuates the valve 26 which directs pressurized fluid from pump 12 to one side of piston 22 depending on the direction of the steering maneuver and opens the other side of piston 22 to the output port 36. The fluid pressure differential across piston 22 acts to move the piston 22 and thereby provides a power steering assist.

An electrically actuated flow control valve 50 between the pump 12 and the power steering gear assembly 16 controls fluid flow from the pump 12 to the assembly 16. The electrically actuated valve 50 can be one of several types having a controllable, variable orifice. One such valve that can be utilized with the present invention is fully disclosed in U.S. Pat. No. 4,099,893 to Coffman, assigned to the assignee of the present invention, and is hereby fully incorporated herein by reference. The valve 50 includes a pintle that is operatively connected to a stepper motor 60. The stepper motor 60, moves the pintle to control (open or close) the orifice of the valve 50 and thereby varies pressurized fluid flow from the pump 12 to the power steering gear assembly 16.

A bypass conduit 64 is connected from the valve 50 to the return conduit 38. When the valve 50 is fully open, all fluid flow is directed to the steering gear assembly 16 and no fluid flows in bypass conduit 64. As fluid flow is decreased to the steering gear assembly 16 by moving the pintle toward a closed position, fluid flow in the bypass conduit 64 is increased. Varying the amount of fluid flow to the steering gear assembly 16 varies the power assist available to aid in a steering maneuver.

An electronic controller 70 is connected to the stepper motor 60 through electrical wires 72 for controlling actuation of the stepper motor 60. A speed sensor 76 is electrically connected to the controller 70 through electrical wires 78. The speed sensor can be one of many types known in the art which generate an electric signal having a frequency that varies as a function of the vehicle speed. The electronic controller 70 receives its operating power from the vehicle battery 80 through electrical wires 82.

The electronic controller 70 includes a selector switch 90 having a plurality of settings. The electronic controller 70 further includes a mode switch 92 that is used to select (i) automatic power assist control or (ii) manually selected, power assist control.

When the mode switch 92 is in the automatic mode position, the signal from the controller 70 regulates the size of the flow control orifice in the valve 50 in response to (i) the signal from the speed sensor 76 and (ii) the setting of the selector switch 90. The signal from controller 70 regulates the size of the orifice within valve 50 so that a first amount of flow is supplied to the assembly 16 when the vehicle speed is below a first value and a second lower amount of flow is supplied when the vehicle speed is above a second value. The signal from the controller 70 further regulates the size of the orifice so that the amount of the flow available to the assembly 16 is between the first amount and the second amount when the vehicle speed is between the first and the second value. The first value and the second value of vehicle speed and the first and second amounts of flow available are dependent upon the setting of the selector switch 90.

The controller 70 further includes a visual display 94 to give a visual indication of the size of the orifice in valve 50, which is indicative of the amount of fluid flow from the pump 12 to the steering gear assembly 16, which is further indicative of the amount of power assist available for a steering maneuver.

Figure 4:
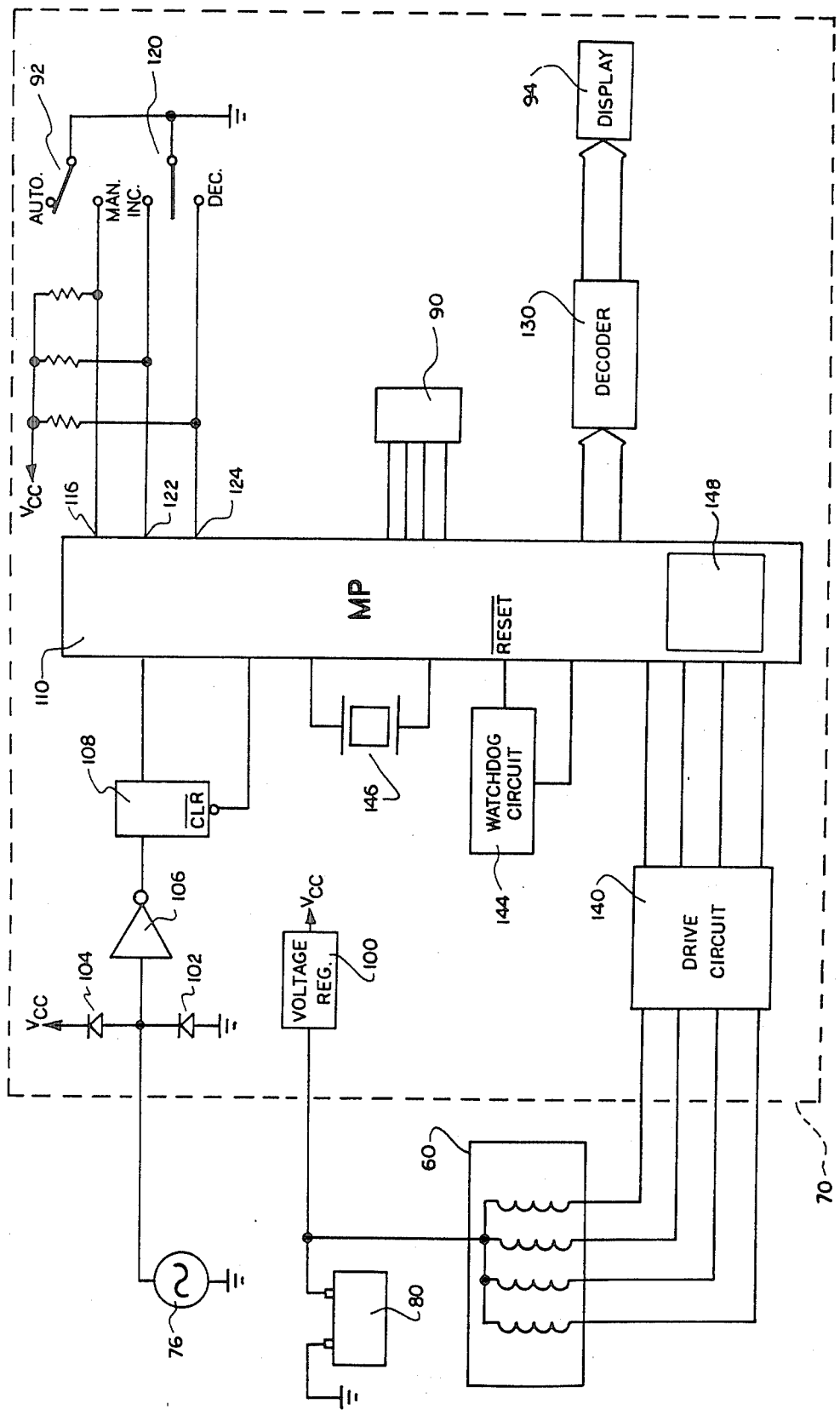
FIG. 4 is a circuit schematic of the control apparatus of FIG. 1.

Referring to FIG. 4, the controller 70 includes a voltage regulator 100 which is operatively connected to the vehicle battery 80 and regulates the voltage for the remainder of the electronics in the controller 70. The speed sensor 76 generates an AC voltage having a frequency proportional to the vehicle speed. The signal from the speed sensor 76 is clipped by diodes 102, 104 and the clipped signal is inputted to a digital gate 106. The output of the gate 106 is a digital squarewave having a frequency equal to the frequency from the speed sensor 76. The output of the gate 106 is connected to the input of a D-type flip-flop 108. The output of the flip-flop 108 is connected to a microprocessor 110. The microprocessor is connected to the reset of the D-type flip-flop. The flip-flop 108 is settable by each cycle of the speed signal from gate 106 and stays set until the microprocessor resets it. The microprocessor determines the vehicle speed from the frequency of the speed signal outputted by the speed sensor 76.

The mode switch 92 is connected to an input 116 on the microprocessor 110. In the arrangement shown, a digital HIGH signal will be present on the input 116 when switch 92 is in the automatic position and a digital LOW signal will be on the input 116 when the mode switch 92 is in the manual position. A momentary switch 120 is operatively connected to inputs 122, 124 of the microprocessor 110. The switch 120 is used for incrementing and decrementing the amount of power assist in a manually selected, fixed, power assist mode which will be described in detail below. The inputs 122, 124 will be at a digital HIGH when switch 120 is not activated and will be at a digital LOW when the switch 120 is moved to the increment or decrement position, respectively.

The selector switch 90 is operatively connected to the microprocessor 110 and has a plurality of settings. The setting of the switch 90 is decodable by the microprocessor 110. For purposes of explanation, it will be assumed that the switch 90 has sixteen possible settings which are binary coded. The microprocessor decodes the binary code to determine the setting of the switch 90.

The microprocessor 110 is operatively connected to a digital decoder 130 which drives the visual display 94. The display 94 can take one of several forms, including a numerical display or preferably a bar graph display device having a plurality of indications that are activated to indicate the power assist available.

The microprocessor 110 is operatively connected to a drive circuit 140 which is in turn operatively connected to the stepper motor 60. The operation and driving of a stepper motor are well known in the art.

The controller 70 further includes a watchdog circuit 144 operatively connected to the microprocessor 110. If an error should occur in the controller 70 such as power failure, noise spike, etc., the watchdog circuit 144 resets the microprocessor to reinitialize the internal program of the microprocessor. A crystal oscillator 146 is connected to the microprocessor to provide for internal timing as is well known in the art.

When the mode switch 92 is in the automatic position, the microprocessor 110 varies the amount of fluid flow from the pump 12 to the steering gear assembly 16 depending on (i) the setting of the selector switch 90 and (ii) the determined vehicle speed. Varying the fluid flow rate varies the power assist available for a steering maneuver. One control option contemplated provides (i) a first fixed flow rate when the vehicle speed is below a first value, (ii) a flow rate that decreases as a function of increasing vehicle speed above the first value and (iii) a second fixed lower flow rate when the vehicle speed reaches a second value. The first and second value of the vehicle speed and the first and second fixed fluid flow rates are established within the control valve 50 and are selected by the setting of the selector switch 90 which is controlled by the vehicle operator.

The microprocessor includes a plurality of sets of memory locations 148, each set including tabulated data having a pintle valve position value for a given vehicle speed. The sets of memory locations amount to look-up tables. The microprocessor selects a look-up table in response to the setting of the selector switch 90. The microprocessor determines the vehicle speed from the speed sensor signal and finds the pintle position value from the look-up table selected by the vehicle operator using the selector switch 90.

There are a plurality of various ways the look-up table or sets of memory locations can be organized and stored within a microprocessor. One contemplated memory storage structure is to have a plurality of memory locations each having a program count address, e.g., 000, 001, ... 100. Such memory locations can be grouped into sets and each memory location within a set contains a pintle position value corresponding to a given vehicle speed. Each set of memory locations is a look-up table. The setting of the selector switch controls an internal vector pointer within the microprocessor that sets an address counter to the beginning of a set of memory locations, i.e., the beginning of a selected look-up table. The determined vehicle speed advances the address counter within the selected look-up table to address a specific memory location within the selected table. The microprocessor controls the pintle position so that the actual pintle position is equal to the pintle position value in the specific memory location addressed.

It is also possible for the microprocessor to perform an algorithm and calculate a pintle position based upon the determined vehicle speed and the setting of the selector switch 90 and to then control the pintle position in accordance with the calculated position.

Figure 5:
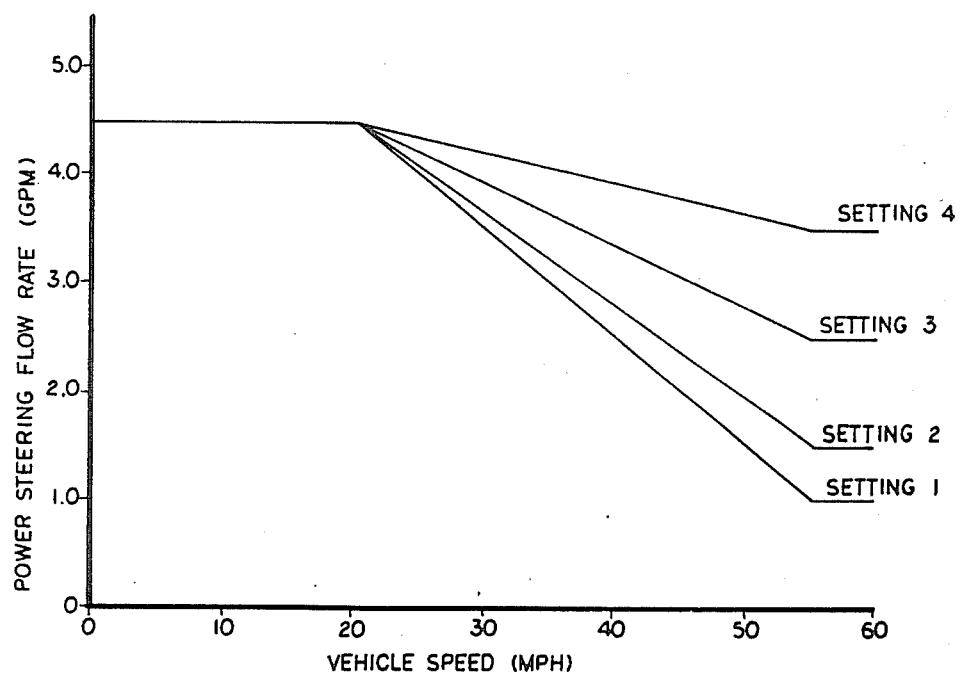
FIG. 5 is a graphical representation of fluid flow rate as a function of vehicle speed for different settable, automatic power assist control options.

Referring to FIG. 5, several steering assist control options are shown, it being understood that they are given for explanation purposes and are not intended to limit the invention thereto. A graph is depicted showing fluid flow rate in gallons per minute versus vehicle speed in miles per hour for four different settings of the selector switch 90, i.e., four different steering control options. For each of the four different positions, the fluid flow rate to the assembly 16 is at a maximum when the vehicle speed is below 20 mph. At 20 mph, the flow rate for all four settings of the selector switch 90 begins to decrease and stop decreasing when the vehicle speed reaches 55 mph. The final flow rate when the vehicle is above 55 mph is held constant at an amount depending on which of the four settings of the switch 90 is selected. Such control options provide the operator with the same steering "feel" when the vehicle speed is below 20 mph but provide different steering "feel" above 20 mph depending on the setting of switch 90. If, for four other settings of the selector switch 90, the fluid flow rate remains constant until the vehicle speed reached 25 mph and then begins to decrease to the same four flow rates at 55 mph as shown in FIG. 5, four more power steering control options would be available.

There are an infinite number of control option possibilities to vary the flow rate responsive to (i) the vehicle speed and (ii) the setting of the selector switch 90. Other possible control options could have a different maximum flow rate when the vehicle speed is less than a first value. Still other control options could have the same eventual minimum flow rate with the minimum flow rate occurring at a vehicle speed that depends on the setting of switch 90. It is contemplated that a control system that permits (i) one maximum flow rate when the speed is below one of a plurality of first values, (ii) a decreasing flow rate to one of a plurality of possible amounts at a second vehicle speed and (iii) a constant fluid flow rate when vehicle speed exceeds the second value would provide satisfactory power steering control options to an operator. Also, the decrease from a maximum to minimum flow rate for each setting of the selector 90 can be any function and does not have to be linear as is depicted in the graph of FIG. 5.

The controller 70 can provide a manually selectable, fixed amount of power assist that is independent of vehicle speed. To activate the manual mode, mode switch 92 is moved to the manual position. In this manual mode, the pintle is movable to a selected position to make a constant amount of power assist available to the steering gear assembly 16 that does not change as vehicle speed varies. The microprocessor maintains the pintle in the selected position until the operator desires to adjust the power assist available. The vehicle operator can increase or decrease the power assist available by moving the momentary switch 120 to the increment or decrement position respectively which in turn causes the microprocessor 110 to drive the stepper motor 60 in the appropriate direction to increase or decrease the fluid flow to the steering gear assembly 16. The microprocessor can be programmed to provide a discrete number of selectable flow rates between the maximum and minimum possible flow rates. Since the fluid flow rate through valve 50 is not a linear function of the pintle position, the microprocessor can be further programmed to move the pintle an amount necessary to have an equal flow rate change between all selectable flow rates.

Figure 6:
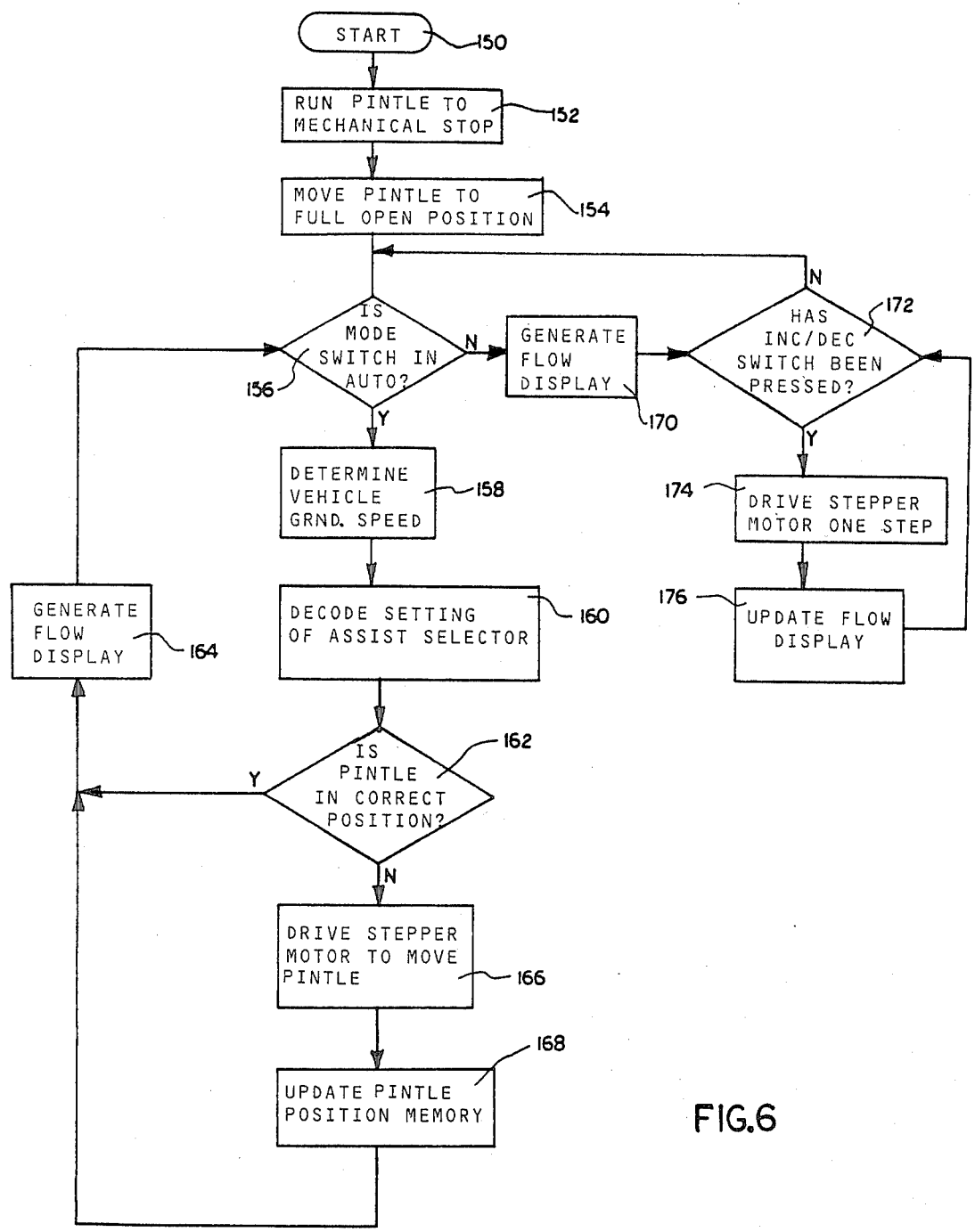
FIG. 6 is a flow diagram depicting the operation of the control apparatus.

Referring to FIG. 6, a flow chart is depicted showing the operation of a control apparatus in accordance with the present invention. The starting of the program in step 150 occurs when the ignition switch for the vehicle is turned on. In step 152, the pintle in the valve mechanism 50 is moved by the stepper motor 60 to a mechanical stop and then the pintle is moved in step 154 to its full open position. In step 156, a determination is made as to whether mode switch 92 is in the automatic mode. If the determination is affirmative in step 156, the speed of the vehicle is determined in step 158.

The setting of the selector switch 90 is decoded in step 160. In step 162 a determination is made as to whether the pintle in the valve 50 is in the correct position to make the desired amount of power assist available which depends on (i) the determined vehicle speed and (ii) the setting of the selector switch 90. The controller 110 includes a plurality of look-up tables. The setting of the selector switch 90 determines which one of the plurality of look-up tables is to be utilized to make the determination in step 162. Once the proper look-up table is selected responsive to the setting of the selector switch 90, the correct pintle position for the determined vehicle speed is obtained from the selected look-up table. The pintle position from the selected look-up table is compared to the actual pintle position and a determination is made as to how far and the direction the pintle is to be moved, if at all.

The pintle position was run to the mechanical stop in step 152 and to a full open position in step 154. The position of the pintle must be stored in memory to perform the determination in step 162. If the pintle is in the correct position, which means that the actual pintle position equals the pintle position from the look-up table, the program proceeds to step 164 where the fluid flow rate is displayed on the display 94. The display 94 can be interpreted as being an indication of pintle position, the fluid flow rate, or the amount of power assist available to aid in a steering maneuver. The program then returns to step 156 and continues in the loop just described.

If the determination in step 162 is negative, the stepper motor is driven in step 166 to move the pintle to coincide with the position from the look-up table in step 162. Step 168 the pintle position memory is updated and the program proceeds to step 164.

As mentioned above, the control apparatus also provides for a manual mode of operation of the power assist system. In the manual mode, the power assist available is manually selected by the operator and remains constant independent of vehicle speed. In step 154, the pintle is in a full open position, which provides maximum power assist available. If switch 92 is in the manual position, the determination in step 156 would be in the negative. The fluid flow rate is displayed in step 170. The pintle position is held constant independent of vehicle speed and thus the amount of power assist available remains constant. In step 172, a determination is made as to whether the momentary switch 120 has been activated. If the determination is negative, the program returns to step 156. If the switch 120 is not activated, the amount of power assist available does not change despite variations in vehicle speed.

It is possible to decrease the power assist available by pushing the momentary switch 120 to the decrement position. Each time the switch is activated, the stepper motor is driven in step 174 by one incremental amount to move the pintle accordingly. Once the pintle is moved from the full open position which was set in step 154, it can be moved toward the full open position by pushing the momentary switch 120 toward the increment position. The display 94 is updated in step 176 to display the fluid flow rate.

It is contemplated that there can be a plurality of steps, i.e., pintle positions, between a maximum fluid flow rate and a minimum fluid flow rate, any one of which can be reached by activation of the momentary switch 120. The changes in fluid flow rate can be any function. If it is desired to have equal flow rate changes between successive steps, the amount of pintle movement between successive steps will not be equal because of the nonlinear function between pintle position and flow rate. Again, the flow rate, i.e., the amount of power assist available, is held constant at its operator set amount independent of vehicle speed and independent of the position of selector switch 90.

If the momentary switch 120 is held in the decrement or increment position for a given amount of time, the microprocessor 110 will continue to drive the stepper motor in the appropriate direction thereby continuously driving the pintle. The continuous stepping occurs because of the closed program loop through steps 172, 174 and 176. By holding the switch 120 in an activated condition, the operator can quickly change to a new amount of desired power assist available by watching the display 94.

This invention has been described with reference to preferred embodiments. Modifications and alterations may occur to others upon reading and understanding this specification. It is our intention to include all such modifications and alteration insofar as they come within the scope of the appended claims. For example, the invention has been described with respect to a flow control valve positioned between the pump and the steering gear assembly. It is also possible to control the fluid flow rate to a steering gear assembly by various other means, such as utilizing an inlet valve between the reservoir and the pump that controls the outlet fluid flow from the pump. It is also possible to utilize a variable drive on a pump of the type whose fluid flow rate depends on the drive speed of the pump.

Another apparatus for controlling the fluid flow rate to the steering gear assembly includes a valve having a solenoid operated pintle that is movable to vary the size of an orifice of the valve. The solenoid is activated by a pulse width modulation circuit. The orifice size is proportional to the pulse width duration. The pulse width modulation circuit is controlled by the microprocessor.

The invention has also been described using a separate momentary switch 120 to control the power assist available in a manual mode of operation. It is possible to use the selector switch 90 as a control to select the manually fixed amount of power assist available. The selector switch 90 would have one control function in the automatic mode and a different control function in the manual mode.

Also, the invention has been described with reference to a hydraulic power assist steering system. The invention is also applicable to an electric assist steering system. In an electric steering system, the control circuit would control the amount of current available to drive the electric power assist motor as a function of both the sensed vehicle speed and the setting of the selector switch 90.

Having described preferred embodiments of the invention, the following is claimed:

1. An apparatus for controlling power assist in a vehicle power steering system, said apparatus comprising;
an electrically actuatable flow control valve in fluid communiation with a source of pressurized fluid, a directional control valve, and a reservoir, said flow control valve directing a first amount of fluid from the source to the directional control valve and bypassing a second amount of fluid from the source to the reservoir, the first amount and second amount of fluid being varied inversely relative to each other responsive to a control signal;
speed sensing means for generating a signal indicative of the vehicle speed;
manually settable selection means for selecting and setting one of a plurality of power assist control options; and
means responsive to the signal from said speed sensing means and to the setting of said selection means for controlling said flow control valve, said power assist available being (i) at a first amount when sensed vehicle speed is below a first value, (ii) at a second amount when sensed vehicle speed is above second value, and (iii) between said first amount and said second amount when sensed vehicle speed is between said first value and said second value, said first and second amounts of power assist available and said first and second values of vehicle speed determined in response to the setting of said selection means.

2. The apparatus of claim 1 wherein said means for controlling said flow control valve includes a microprocessor having a plurality of sets of memory locations, each memory location having an orifice control value, said microprocessor selecting (i) a set of memory locations in response to the setting said selection means and (ii) a memory location within a selected set of memory locations in response to the signal from said speed sensing means.

3. The apparatus of claim 1 further including display means for visually displaying the power assist available.

4. An apparatus for controlling a power assist steering system, said apparatus comprising:
an electrically actuatable flow control valve in fluid communication with a source of pressurized fluid, a directional control valve and a reservoir, said flow control valve directing a first amount of fluid from the source to the directional control valve and bypassing a second amount of fluid from the source to the reservoir, the first amount and second amount of fluid being varied inversely relative to each other responsive to a control signal;
speed sensing means for generating a signal indicative of the vehicle speed;
manually settable selection means for selecting and setting one of a plurality of steering assist control options;
mode selection means for manually selecting between a settable, automatic power assist control mode and a manually selected, fixed, power assist mode of controlling said power assist steering system;
means for controlling said flow control valve to (i) vary power assist available when said settable, automatic power assist control mode is selected by said mode selection means responsive to the signal from said speed sensing means and to the setting of said manually settable selection means, and (ii) maintain available power assist constant when said manually selected, fixed, power assist mode is selected by said mode selection means at a manually selectable, fixed amount independent of vehicle speed.

5. The apparatus of claim 4 further including a means to change said manually selectable amount of power assist available when said manual mode is selected by said mode selection means.

6. The apparatus of claim 5 wherein said power assist is provided by fluid flow from the source of pressurized fluid acting on a hydraulic power assist steering motor and said first means is operable to vary said fluid flow.

7. An apparatus for controlling a power assist steering system, said apparatus comprising:
an electrically actuatable flow control valve in fluid communication with a source of pressurized fluid, a directional control valve, and a reservoir;
control means for controlling said flow control valve in response to an electrical control signal, said flow control valve directing a first amount of fluid from the source of pressurized fluid to the directional control valve and bypassing a second amount of fluid from the source of pressurized fluid to the reservoir, the first amount and second amount of fluid being varied inversely relative to each other by said control means in response to said electrical control signal;
speed sensing means for generating a signal indicative of vehicle speed;
addressable storage means for storing a plurality of sets of power assist values, each set having a power assist value for a given vehicle speed;
switch means accessible to a vehicle operator for selecting one of said sets of power assist values; and
circuit means connected to said control means, said speed sensing means, said addressable storage means, and said switch means for addressing a set of power assist values from said stored sets in response to said switch means, selecting a power assist value from an addressed set in response to said speed sensing means and generating said electrical control signal for said control means in response to said selected power asssist value from said addressed set.

8. The apparatus of claim 7 wherein said circuit means is a microprocessor and wherein said storage means is a plurality of memory locations, each location having a numeric address sequentially arranged, each set of memory locations having a predetermined number of numerically addressable memory locations, said microprocessor including an address counter for generating a count depending upon vehicle speed and a setting of the switch means, each setting of said switch means determining a set of memory locations being addressed.

9. The apparatus of claim 7 wherein power assist is provided by fluid flow from the source of pressurized fluid acting on a hydraulic power assist motor.

* * * * *